No. 698,250. Patented Apr. 22, 1902.
G. B. BLANCHARD.
RAIL BOND.
(Application filed Jan. 13, 1902.)

(No Model.)

Witnesses:
H. B. Davis.
M. E. Bill

Inventor:
George B. Blanchard
by B. Johnson
Atty.

UNITED STATES PATENT OFFICE.

GEORGE B. BLANCHARD, OF TACOMA, WASHINGTON.

RAIL-BOND.

SPECIFICATION forming part of Letters Patent No. 698,250, dated April 22, 1902.

Application filed January 13, 1902. Serial No. 89,434. (No model.)

*To all whom it may concern:*

Be it known that I, GEORGE B. BLANCHARD, of Tacoma, county of Pierce, State of Washington, have invented an Improvement in Rail-Bonds, of which the following description, in connection with the accompanying drawings, is a specification, like letters on the drawings representing like parts.

This invention relates to rail-bonds, and is intended as an improvement upon the rail-bond shown and described in United States Patent No. 658,759, dated October 2, 1900, granted to me. In said patent a laminated strip comprising a pair of flat feet and an extensible intermediate portion is shown composed of a single strip of sheet-copper or other metal folded upon itself and having the layers composing the flat feet soldered together and the layers composing the intermediate portion unattached, and the several layers composing the flat feet additionally secured together by integral portions of the lowermost layer. A mass of solder was secured to the bottom of each flat foot, which served as a means of attaching the bond to the rails.

This invention has for its object to improve the construction of said rail-bond in several particulars, whereby it may be more easily and cheaply made, the layers composing its flat feet more effectively secured together, and the bond better adapted to be readily applied to the rails.

In accordance with this invention the laminated strip is composed of several like strips of sheet-copper or other metal, one of which is considerably longer than the others, and the ends of all of said strips are dipped in melted solder, and thereby completely coated, and said strips are then superimposed, with the longer strip on the outside, and the opposite ends of said strips are turned up over and upon the assembled end portions of the other strips to thereby form the flat feet, and the several layers composing said flat feet are then secured together by heating, while they are firmly held by a suitable clamp or under pressure. A ribbon of solder is then attached to the bottom or top of each flat foot, and in practice this ribbon of solder is attached at one end only, so that it may be bent outward or away from the foot to which it is attached for the purpose of enabling any suitable soldering fluid to be introduced between the surfaces when applying the bond to the rails; yet, if deemed desirable, said ribbons of solder may be otherwise attached to the flat feet.

Figure 1:
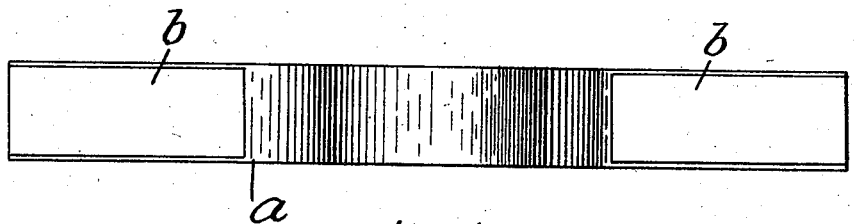
Figure 2:
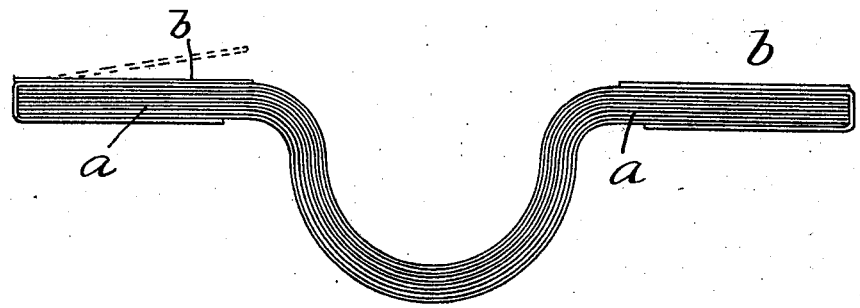
Figure 3:
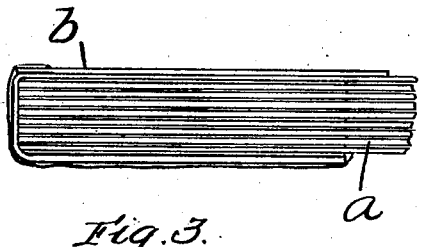
Figure 4:

Figure 1 shows in plan view a rail-bond embodying this invention. Fig. 2 shows in side elevation a rail-bond embodying this invention, the ribbon of solder which is attached to the bottom of one of the flat feet being represented by dotted lines as bent outward for the purpose of permitting a thorough introduction of the soldering fluid when applying the bond to the rails. Fig. 3 is a longitudinal vertical section of a portion of the rail-bond on a large scale. Fig. 4 shows in side elevation a modified form of rail-bond embodying this invention.

*a* represents the several strips of sheet-copper or other metal, which may be of any suitable length and width and formed with an arched intermediate portion and flat end portions, although so far as my invention is concerned the intermediate portion may be of any desired design to provide for suitable extensibility. Any number of strips may be employed. The flat end portions of all the strips are dipped in melted solder, and thereby coated exteriorly up to the junction thereof with the intermediate portion. The several strips are then superimposed or assembled together. One of the outside strips is made longer than the other strips, and in the manufacture of the bond the end portions of said longer strip are turned up over and upon the superimposed end portions of all the other strips. The end portions of the longer strip are likewise dipped in melted solder up to the junction of the intermediate portion, so that said end portions will be completely coated exteriorly with solder from end to end. The end portions of the longer strip having been turned up over and upon the other superimposed end portions, a pair of flat feet will be produced, and all the layers composing said flat feet are then secured together by heating them while they are firmly held by any suitable clamp or under pressure. In practice I find that the layers composing the flat feet will be more effectively secured together and a better electrical connection thereby insured by making the several layers independent and separately dipping them in melted solder and thereafter securing them together. Instead of applying to the bottoms of the flat feet a mass of solder, as in my patent aforesaid, I herein attach a ribbon of solder, as in practice it is very difficult to apply a mass of solder and properly secure the same to the bottoms of the flat feet without unsoldering, and thereby more or less separating, the layers composing said flat feet. The ribbons of solder are represented at *b* and are herein shown as attached to the bottoms of the flat feet at one end only. This is important for the reason that it enables them to be bent outward or away from the flat feet to provide for the thorough introduction of the soldering fluid when applying the bond to the rails; yet in some instances I may otherwise attach said ribbons of solder to the flat feet.

In Fig. 2 the lowermost strip is the longer one, and the ribbons of solder are attached to the bottoms of the flat feet; but in Fig. 3 a modification of my invention is illustrated, wherein the uppermost strip is longer and the ribbons of solder are attached to the tops of the flat feet, in either case the longer strip being the outside strip.

What I do claim, and desire to secure by Letters Patent, is—

1. A rail-bond consisting of a laminated strip formed to present a pair of flat feet and an extensible intermediate portion, and composed of a number of superimposed independent strips, the end portions of all of which are completely coated with solder, one of the outside strips being made longer than the other strips having its end portions turned up over and upon the other end portions, and a ribbon of solder attached to one side of each flat foot, substantially as described.

2. A rail-bond consisting of a laminated strip formed to present a pair of flat feet and an extensible intermediate portion and a ribbon of solder attached at one end to one side of each flat foot, substantially as described.

In testimony whereof I have signed my name to this specification in the presence of two subscribing witnesses.

GEORGE B. BLANCHARD.

Witnesses:
B. J. NOYES,
M. E. BILL.